US011379770B2

(12) United States Patent
Yamane et al.

(10) Patent No.: US 11,379,770 B2
(45) Date of Patent: Jul. 5, 2022

(54) INTELLIGENT VIRTUAL AGENT FOR MANAGING CUSTOMER COMMUNICATION AND WORKFLOWS

(71) Applicant: Accenture Global Solutions Limited, Dublin (IE)

(72) Inventors: Keisuke Yamane, Tokyo (JP); Takatsuna Awakura, Tokyo (JP); Shinji Makabe, Tokyo (JP); Takayuki Kumon, Tokyo (JP); Hirotoshi Mizukami, Tokyo (JP); Akira Yagi, Tokyo (JP); Kazuya Sakada, Tokyo (JP); Akihisa Naruo, Tokyo (JP); Akio Hoshikawa, Tokyo (JP)

(73) Assignee: Accenture Global Solutions Limited, Dublin (IE)

(*) Notice: Subject to any disclaimer, the term of this patent is extended or adjusted under 35 U.S.C. 154(b) by 261 days.

(21) Appl. No.: 16/590,767

(22) Filed: Oct. 2, 2019

(65) Prior Publication Data

US 2020/0134532 A1    Apr. 30, 2020

Related U.S. Application Data

(60) Provisional application No. 62/740,742, filed on Oct. 3, 2018.

(51) Int. Cl.
*H04L 51/02* (2022.01)
*G06Q 10/06* (2012.01)
*H04L 51/046* (2022.01)
*H04L 51/18* (2022.01)

(52) U.S. Cl.
CPC ....... *G06Q 10/06316* (2013.01); *H04L 51/02* (2013.01); *H04L 51/046* (2013.01); *H04L 51/18* (2013.01)

(58) Field of Classification Search
CPC . G06Q 10/06316; H04L 51/046; H04L 51/18; H04L 51/02
See application file for complete search history.

(56) References Cited

U.S. PATENT DOCUMENTS

| 2008/0155042 | A1* | 6/2008 | Heinle | G06Q 10/10 709/206 |
| 2012/0314954 | A1* | 12/2012 | Moore | G06K 9/2063 382/182 |
| 2017/0310613 | A1* | 10/2017 | Lalji | H04L 67/20 |

FOREIGN PATENT DOCUMENTS

| JP | 6263668 B1 | 1/2018 |
| JP | 2018-151724 A | 9/2018 |

OTHER PUBLICATIONS

Notice of Refusal dated Nov. 10, 2020 for Japanese Patent Application No. 2019-183339.
Developed a chatbot platform [Smart Message Bot] compatible with major chat services such as Line, published Dec. 1, 2016; https://news.neoscorp.jp/news-bot-release/.
Yasukawa, Yukitoshi ; "Satellite office starts providing task management function by Line Works", published Nov. 29, 2017, https://news.mynavi.jp/article/20171129-549490/.

* cited by examiner

*Primary Examiner* — Soe Hlaing
(74) *Attorney, Agent, or Firm* — Plumsea Law Group, LLC

(57) ABSTRACT

The disclosed intelligent virtual agent provides a single, unified platform for completing a variety of diverse complex business transactions including a series of interactions between multiple people and the performance of multiple tasks occurring at different points in time.

20 Claims, 6 Drawing Sheets

INTELLIGENT VIRTUAL AGENT FOR MANAGING CUSTOMER COMMUNICATION AND WORKFLOWS

CROSS-REFERENCE TO RELATED APPLICATIONS

This application claims the benefit of U.S. Provisional Patent Application No. 62/740,742, filed Oct. 3, 2018, and titled "Intelligent Chatbot Service that Seamlessly Processes and Supports Customer Communication," which is incorporated by reference herein in its entirety.

TECHNICAL FIELD

The present disclosure generally relates to management of customer communication and workflows. More specifically, the present disclosure generally relates to an intelligent virtual agent for managing customer communication and workflows.

BACKGROUND

Virtual agents are computer-generated agents that can interact with users. Goal- or task-oriented virtual agents may communicate with human users in a natural language and work with or help the users in performing various tasks. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Virtual agents are increasingly used to help the user perform certain tasks quickly and efficiently. Currently virtual agents typically communicate with a single user and only perform simple tasks. Conventional virtual agents do not provide a way to interact with multiple users (e.g., customer and enterprise employees of varying positions/authority levels) related to a single complex interaction (e.g., a mortgage application) having many tasks that can occur over the course of several days or months. Furthermore, virtual agents do not currently provide a way of analyzing the use of the virtual agent by the multiple users. Further still, virtual agents do not currently provide a way of using this analysis to improve the use of the virtual agent.

Many complex business transactions include a series of interactions between multiple people and the performance of multiple tasks occurring at different points in time. For example, in the case of a bank processing a loan (e.g., mortgage) application, multiple bank employees typically work on a single mortgage application. Often, the different employees update information for the mortgage application and/or communicate with the customer seeking the mortgage at different points in time. In some situations, the bank employees may need to bring a supervisor into the mortgage workflow (e.g., to address a particular situation) to obtain approval, access information, or perform tasks only those with certain levels of authority can access or perform. Multiple people touching a single loan application at different points in time can become complicated, as the state of the many parts of the loan application is not readily visible at each point in time.

Additionally, in many businesses, the user interface of employee systems varies per systemized workflow or per customer service, such as credit review, loan agreement, customer's background check, etc. Accordingly, consistency amongst workflows and customer services is lacking. For example, in typical banking systems, the applications for customer service differ per service. As a result, these banking systems have difficulty providing centralized management of customer activity logs. The process of extracting the customer activity log from each application is slow, since those applications lack centralized management.

There is a need in the art for a system and method that addresses the shortcomings discussed above.

SUMMARY

The disclosed intelligent virtual agent solves problems associated with conventional techniques, such as those discussed above, by providing a single platform capable of completing complex business transactions including a series of interactions between multiple people and the performance of multiple tasks occurring at different points in time. These complex business transactions may also be referred to herein as a workflow. A workflow may include computer implemented tasks associated with performing a complex business transaction. For example, in a business entity, such as a bank, workflows may include loan (e.g., mortgage, car loan, etc.) applications, credit reviews, customer onboarding, audits, etc. In another example, in a business entity, such as a health care enterprise, workflows may include patient billing, patient medical history reviews, updating patient medical charts, etc. The disclosed intelligent virtual agent provides a single platform that is capable of handling different types of workflows such that many business groups of a single enterprise may experience the same, consistent user interface. This consistency enhances predictability in handling different types of workflows. In some implementations, the tasks may be performed in response to commands received by the virtual agent in chat messages.

Some implementations, described herein, provide a connection platform that utilizes machine learning models and big data to improve chatbot interactions. For example, the connection platform may receive, from client devices, interaction information associated with interactions between users of the client devices (e.g., customers and customer service representatives). In some implementations, the interaction information may include hundreds, thousands, millions, and/or the like data points received from hundreds, thousands, millions, and/or like client devices, and may present a big data problem to the connection platform. The connection platform may process, or analyze, the interaction information, with one or more machine learning models, to identify one or more actions to perform, which improves chatbot interactions. The connection platform may automatically cause the one or more actions to be performed to improve chatbot interactions.

Using disclosed devices and/or techniques, the connection platform may improve chatbot interactions so that customers may utilize client devices to interact with the chatbots directly (e.g., rather than with humans). The connection platform may enable the virtual agents to conduct meaningful interactions with customers and to solve multiple issues presented by the customers. Furthermore, since the virtual agents preclude the need for human customer service representatives, the connection platform may conserve resources (e.g., processing resources, memory resources, monetary resources, and/or the like) that would otherwise be wasted with utilizing human customer service representatives and, more particularly. In addition, the virtual agents can reduce and/or eliminate inefficient conduct (e.g., errors) associated with human customer service representatives.

In one aspect, the disclosure provides a method of using a virtual agent to perform a first workflow comprising multiple tasks. The method may include sending messages to and receiving messages from a first user, and a second user. The first user may have a first state and the second user may have a second state. The messages may be sent and received via one or more of a frontend component and a chat engine. The chat engine may have a chat server and a bot server. At least one of the received messages may include a request associated with the first workflow. The method may include using the bot server to: receive at least one chat command included in at least one of the received messages, request external services based on the at least one chat command, or obtain user information related to one of the first user and the second user. The method may include using a workflow server to: start and manage a first instance of the first workflow, the starting and managing the first instance of the first workflow including managing the multiple tasks. The multiple tasks may include a first task and a second task. The method may include storing information in a data lake. The information may include the state of the first user and/or the state of the second user after completing the first task. The method may include using the information stored in the data lake during the second task of the first workflow.

In yet another aspect, the disclosure provides a non-transitory computer-readable medium storing software that may comprise instructions executable by one or more computers which, upon such execution, cause the one or more computers to send messages to and receive messages from a first user, and a second user. The first user may have a first state and the second user may have a second state. The messages may be sent and received via one or more of a frontend component and a chat engine. The chat engine may have a chat server and a bot server. At least one of the received messages may include a request associated with the first workflow. The instructions may cause the one or more computers to use the bot server to receive at least one chat command included in at least one of the received messages, request external services based on the at least one chat command, or obtain user information related to one of the first user and the second user. The instructions may cause the one or more computers to use a workflow server to start and manage a first instance of the first workflow, the starting and managing the first instance of the first workflow including managing the multiple tasks. The multiple tasks may include a first task and a second task. The instructions may cause the one or more computers to store information in a data lake. The information may include the state of the first user and/or the state of the second user after completing the first task. The instructions may cause the one or more computers to use the information stored in the data lake during the second task of the first workflow.

In yet another aspect, the disclosure provides a system for using a virtual agent to perform a first workflow comprising multiple tasks, where the system comprises one or more computers and one or more storage devices storing instructions executable by one or more computers which, upon such execution, cause the one or more computers to send messages to and receive messages from a first user, and a second user. The first user may have a first state and the second user may have a second state. The messages may be sent and received via one or more of a frontend component and a chat engine. The chat engine may have a chat server and a bot server. At least one of the received messages may include a request associated with the first workflow. The instructions may cause the one or more computers to use the bot server to receive at least one chat command included in at least one of the received messages, request external services based on the at least one chat command, or obtain user information related to one of the first user and the second user. The instructions may cause the one or more computers to use a workflow server to start and manage a first instance of the first workflow, the starting and managing the first instance of the first workflow including managing the multiple tasks. The multiple tasks may include a first task and a second task. The instructions may cause the one or more computers to store information in a data lake. The information may include the state of the first user and/or the state of the second user after completing the first task. The instructions may cause the one or more computers to use the information stored in the data lake during the second task of the first workflow.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
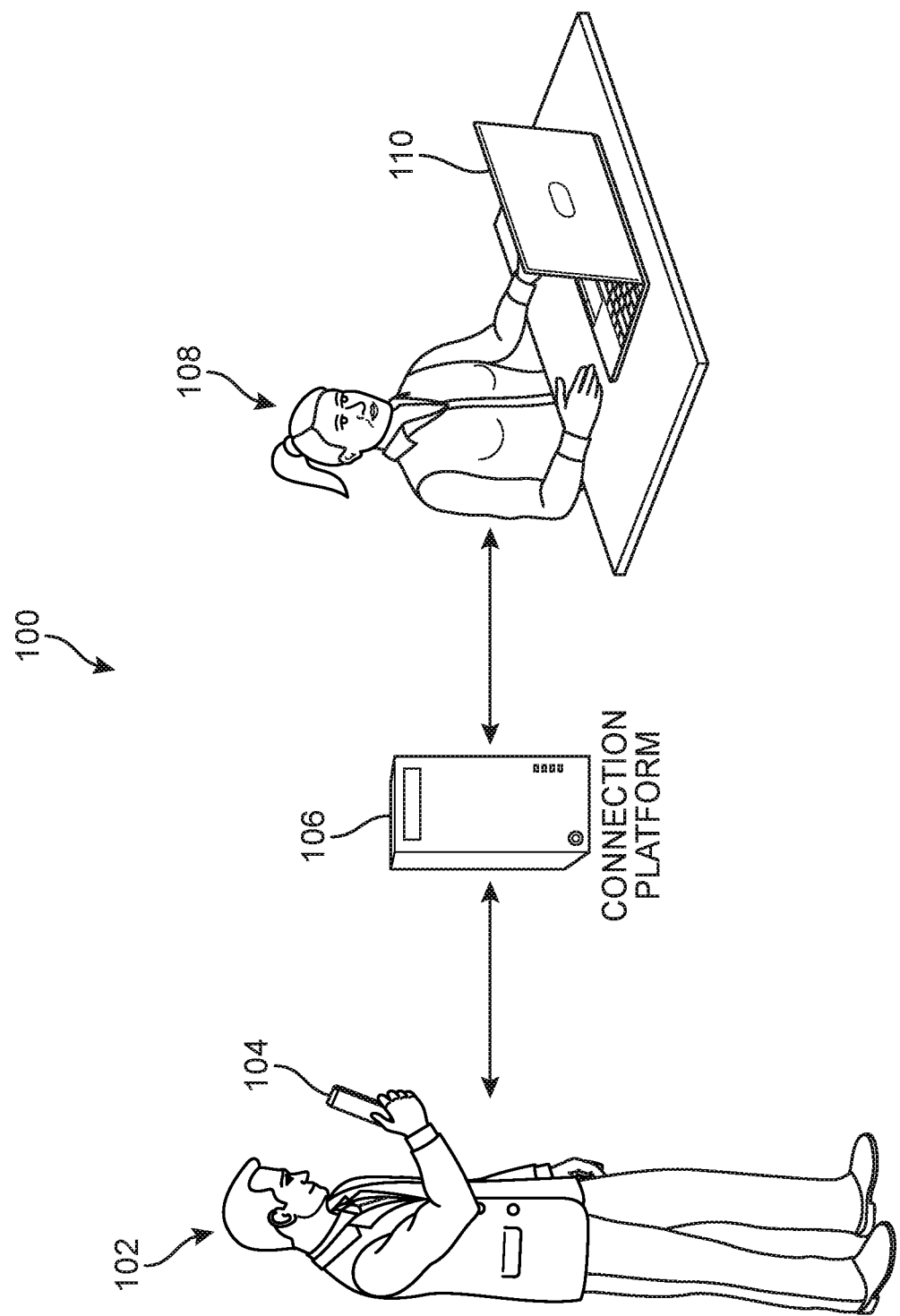
FIG. 1 is a schematic diagram of an implementation, including a first client device, a first user, a second client device, and a second user all associated with a connection platform.
Figure 2:
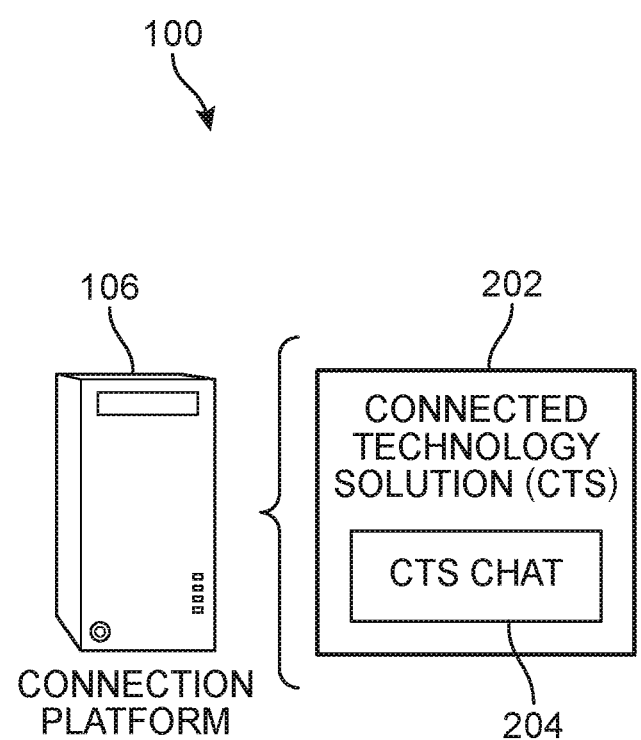
FIG. 2 is a schematic diagram of an implementation, including a connected technology solution (CTS) component and a CTS chat component of the connection platform.
Figure 3:
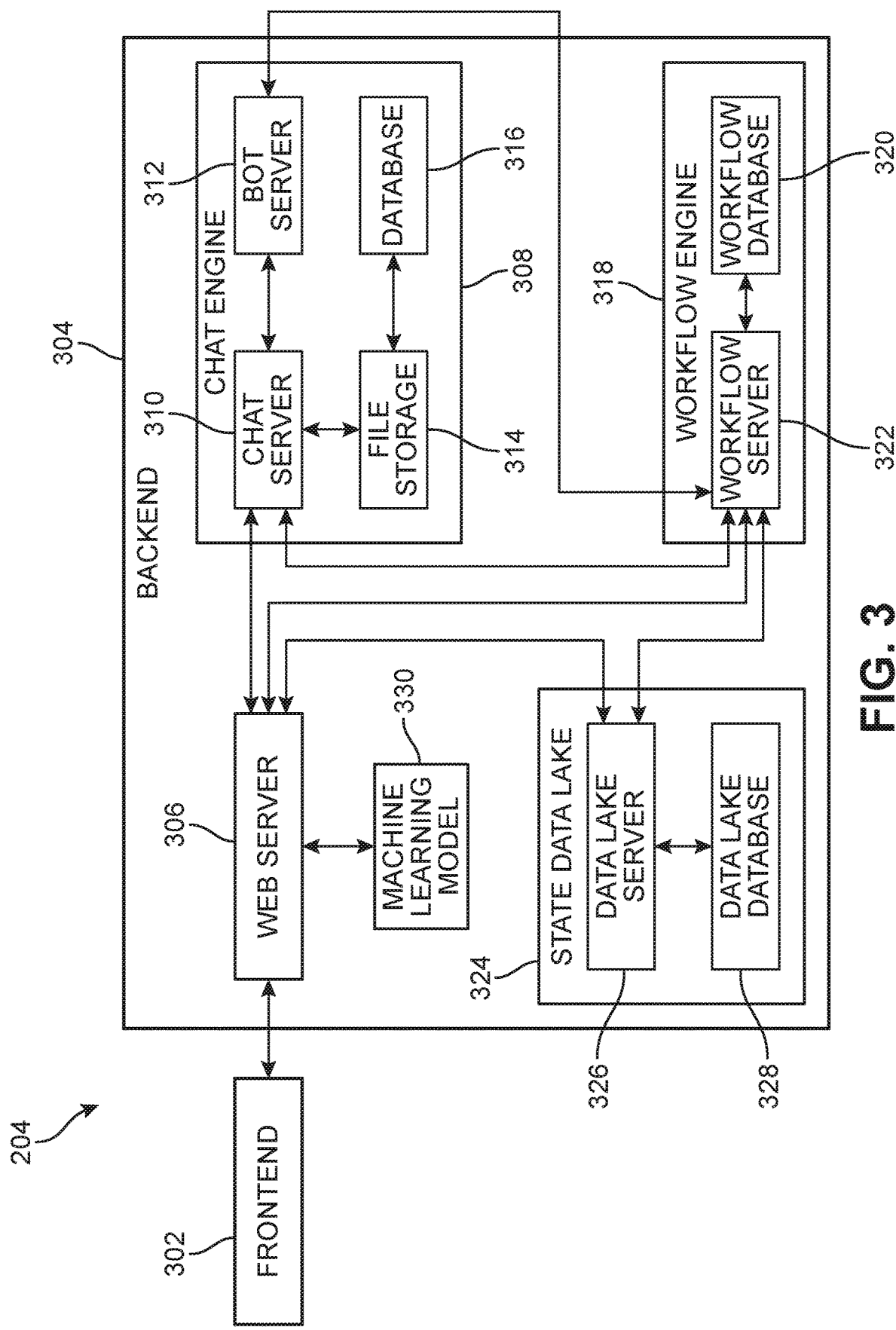
FIG. 3 is a schematic diagram of details of the CTS chat component of the connection platform.

FIGS. 1-3 are diagrams of an example implementation 100 described herein. As shown in FIG. 1, a first client device 104 may be associated with a connection platform 106 and a first user 102 (e.g., an employee or a customer). A second client device 110 may be associated with connection platform 106 and a second user 108 (e.g., an employee or a customer). In some implementations, the first user and the second user may both be employees. In some implementations, the first user may be a customer and the second user may be an employee. In some implementations, the connection platform may be associated with hundreds, thousands, millions, and/or the like client devices and users, and may receive interaction information from the client devices. For example, an enterprise, such as a bank, may have thousands of employees all using the connection platform as a unified system for the diverse types of workflows the individual employees use. In such a bank, an employee may conduct credit reviews by communicating with a chatbot and/or by following the chatbot's instructions. The chatbot may act as a standard interface for the bank system that is used by employees to perform some or all of their work, as well as for communicating with customers. By making the user interface of a variety of systemized workflows consistent (i.e. chatbot is the only user interface for all the systemized workflows in an enterprise), developing an additional systemized workflow is easier, since the user interface will be the same.

In some implementations, the interaction information may include information identifying issues presented by customers, solutions to issues presented by the customers, questions posed by the customers, answers to the questions posed by the customers, products and/or services discussed during interactions, topics discussed during the interactions, and/or the like.

By using the chatbot for both the customer communication and the employee's service to the customer, it is easier to manage the customer activity log (e.g. what kind of service the customer used, when and how he/she did so, etc.) across the customer services. It enables a quicker analysis of the customer's activity log as well as employee's activity log per customer and a quicker action based on the analysis. For example, if a customer activity log and an employee activity log suggest that the employee reacted slowly to the customer's request on a particular service, the analysis can be used to come up with a solution, such as sending an apology email to the customer with a coupon for another service. As another example, if an enterprise customer's activity log suggests that the customer's transaction frequency is increasing or the transaction amount is increasing (or decreasing), this change in transactions can be analyzed to determine a customer's relationship with the enterprise. This analysis can be used to make business decisions about actions to take, such as proposing a new service to the customer.

As previously mentioned, the virtual agent may be used for the direct communication between the customer and the employee. This direct communication enables easier centralized management of the customer and employee activity log.

As shown in FIG. 2, connection platform 106 may include a connected technology component (CTS) component 202 and a CTS chat component 204.

CTS component 202 may connect channels, Internet of Things (IoT) devices, external application programming interfaces (APIs), existing systems, and/or the like to provide a new platform for an entity. In some implementations, the CTS component may personalize the connection platform to customers, may provide API scalability, may perform big data analysis, may enable development of solutions for building new digital ecosystems, and/or the like.

CTS chat component 204, described below in connection with FIG. 3, may provide a platform that seamlessly connects multiple entities, customers, and/or the like to provide customer-centric operations.

As shown in FIG. 3, CTS chat component 204 of the connection platform may include a frontend component 302 that includes a runtime component, a developer language component, and a build tools component. CTS chat component 204 may also include a backend component 304 that includes a web server 306, a chat engine 308 (e.g., that includes an application server, a bot server, storage, and a database), state data lake 324 (e.g., that includes an application server and a database), and a workflow engine 318 (e.g., that includes an application server and a database).

Frontend component 302 may provide frontend services for interacting with users of the connection platform 106. In some implementations, the frontend component may provide front end services, such as sending and receiving chat messages, switching a chat destination, creating application forms used by a chat user interface, uploading files, providing an error log, and/or the like.

The runtime component, of frontend component 302, may conduct a two-way communication between two parties, may begin an interaction with chat messages, may switch users for a chat, may provide a user interface for filling out a form via dialogue, may upload image files during a chat, may send error logs indicating errors that occurred, and/or the like.

The developer language component and the build tools component may enable developers to develop/build applications for the CTS chat component. In some implementations, the developer language component and the build tools component may provide tools that enable developers to build and develop the applications for the CTS chat component.

Backend component 304 may provide backend services that improve chatbot interactions. In some implementations, the backend component may use backend services to process interaction information (e.g., received via the frontend component and described above), with a machine learning model 330, to determine one or more actions to perform, and to determine actions that improve chatbot interactions.

In some implementations, the backend component 304 may perform a training operation on the machine learning model using historical interaction information (e.g., historical information identifying previous interactions with chatbots, live representatives, and/or the like). For example, the backend component may separate the historical interaction information into a training set, a validation set, a test set, and/or the like. In some implementations, the backend component may train the machine learning model using, for example, an unsupervised training procedure. The backend component may train the machine learning model with the training set from the historical interaction information. For example, the backend component may perform dimensionality reduction to reduce the historical interaction information to a minimum feature set. In other words, the random variables under consideration in the historical interaction information may be reduced to a minimum feature set, which is a smaller set of variables better suited for comparison. Using a minimum feature set for training reduces resources (e.g., processing resources, memory resources, and/or the like) used to train the machine learning model. The backend component may apply a classification technique to the minimum feature set.

In some implementations, backend component 304 may use a logistic regression classification technique to determine a categorical outcome (e.g., how the historical interaction information resolved customer issues). Additionally, or alternatively, the backend component may use a native Bayesian classifier technique. In this case, the backend component may perform binary recursive partitioning to split the historical interaction information into partitions and/or branches and use the partitions and/or branches to perform predictions (e.g., how the historical interaction information resolved customer issues). Based on using recursive partitioning, the backend component may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the backend component may use a support vector machine (SVM) classifier technique to generate a non-linear boundary between data points in the training set. In this case, the non-linear boundary is used to classify test data into a particular class.

Additionally, or alternatively, the backend component may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the backend component may use one or more other model training techniques, such as a neural network technique, a latent semantic indexing technique, and/or the like. For example, the backend component may perform an artificial neural network processing technique (e.g., using a two-layer feedforward neural network architecture, a three-layer feedforward neural network architecture, and/or the like) to perform pattern recognition with regard to optimal regions of the historical interaction information. In this case, using the artificial neural network processing technique may improve an accuracy of the trained machine learning model generated by the backend component by being more robust to noisy, imprecise, or incomplete data, and by enabling the backend component to detect patterns and/or trends undetectable to human analysts or systems using less complex techniques.

Web server 306 may include a server device that provides a communication link between the frontend component, and the application servers of the backend component.

Chat engine 308 may send and receive chat messages by conducting a two-way communication and beginning an interaction with chat messages, may store and/or manage room information associated with a chat session, may provide a chatbot that utilizes specific prepositions, may store a command history utilized by the chatbot, may search previous chat messages, may upload and download files (e.g., image files) via chat sessions, and/or the like. In some implementations, the chat engine may utilize WebSocket, server-sent-event (SSE), and/or the like to push data to client devices.

Chat engine 308 may include chat server 310 (e.g., a server device) that performs one or more of the functions described above in connection with the chat engine.

Chat engine 308 may include a bot server 312 that may receive and analyze chat command(s) and obtain scripts and/or parameters from the chat commands, may obtain user information associated with a user interacting with the chatbot, may send a result of executing a script as chat messages, may request external services via a hypertext transfer protocol (HTTP) request, may receive results based on execution of external services, may execute specific scripts, and/or the like.

In some implementations, bot server 312 may include an adapter component and a script component. The adapter component may be responsible for communication with users. The script component may perform processing according to script instructions, define behavior of the chatbot, may provide a request to an external domain, and/or the like. In some implementations, the bot server may enable new features to be added to the chatbot without updating a user interface, may enable development of bot scripts quickly, and/or the like. In some implementations, the bot server may cooperate with external services (e.g., Slack). For example, in some implementations, the adapter may communicate with an external service. In some implementations, the bot script may include a template to help developers create an appropriate script for a particular situation. For example, a template may include (1) setting the command name to be linked with script, (2) arguments required, (3) wording to be displayed in help, and (4) processing logic.

Chat engine 308 may include file storage 314 to provide storage for chat server 310 and/or bot server 312.

Chat engine 308 may include a database 316 that provides a data structure (e.g., a database, a table, a list, and/or the like) for the chat server and/or the bot server.

State data lake 324 may receive data from the chatbot and may convert the data into converted data (e.g., a model). The state data lake may calculate a future state based on the converted data and may store the converted data in a data lake (e.g., the database). In some implementations, the state data lake may manage state information of the converted data and may be a source of data for future chat sessions by the chatbot. In some implementations, the state data lake collects information about users of the system, which may include, for example, both employees and customers. For example, the state data lake may manage a state of a customer and help with sales and marketing. In another example, the state data lake may manage system users' usage of the system, as well as relations with customers to help streamline business operations. In some implementations, the state data lake may manage the states related to workflows and/or workflow instances. The relations with the customers may include interactions with the customers that demonstrate the loyalty of the customer to the business. By using a state data lake, the platform may have access to big data that the platform can analyze. The platform can use this analysis to make business decisions (e.g., related to marketing toward customers or employee training) and improve workflows with modifications. For example, the platform may analyze a user's (e.g., employee) usage tendency to determine if the employee has a trend of making errors or taking too long to complete tasks. In another example, the platform may analyze the interactions between a customer and a business entity to determine a customer's loyalty to the business entity, whether the customer often interacts with the business entity, whether the customer may be interested in other products by the business entity, or whether the customer has made complaints about the business entity.

State data lake 324 may include a data lake server 326 including a server device that may perform one or more of the functions described above in connection with state data lake 324.

State data lake 324 may include a database 328 that may provide a data structure (e.g., a database, a table, a list, and/or the like) for data lake server 326.

Workflow engine 318 may register a workflow definition, may begin a defined workflow, may update an executed workflow state, may execute required state transition, may obtain user information associated with a user that began a workflow or an executed state transition, may obtain authority information, may search an executed workflow, may search for state, executers, or users capable of executing an upcoming transaction, may call external services via a HTTP request, may receive results of execution by external services, may provide a notification when errors occur at a state transition, and/or the like. In some implementations, the workflow engine, when moving to another workflow, may enable processing between a current workflow and the other workflow and may update the state if the processing is successful. Workflow engine 318 may start an instance of a workflow and manage multiple tasks within the workflow.

Workflow engine 318 may include a workflow server 322 that includes a server device that performs one or more of the functions described above in connection with workflow engine 318.

Workflow engine 318 may include a workflow database 320 that may provide a data structure (e.g., a database, a table, a list, and/or the like) for workflow server 322.

In this way, several different stages of the process for utilizing machine learning models and big data to improve chatbot interactions may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning models and big data to improve virtual agent interactions and workflows performed by virtual agents. Finally, automating the process for utilizing machine learning models and big data to improve virtual agent interactions conserves computing resources (e.g., processor resources, memory resources, and/or the like) that would otherwise be wasted in attempting to improve chatbot interactions.

The number and arrangement of devices and components shown in FIGS. 1-3 are provided as an example. In practice, there may be additional devices and/or components, fewer devices and/or components, different devices and/or components, or differently arranged devices and/or components than those shown in FIGS. 1-3. Furthermore, two or more components shown in FIGS. 1-3 may be implemented within a single component, or a single component shown in FIGS. 1-3 may be implemented as multiple, distributed components. Additionally, or alternatively, a set of components (e.g., one or more components) shown in FIGS. 1-3 may perform one or more functions described as being performed by another set of components shown in FIGS. 1-3.

Figure 4:
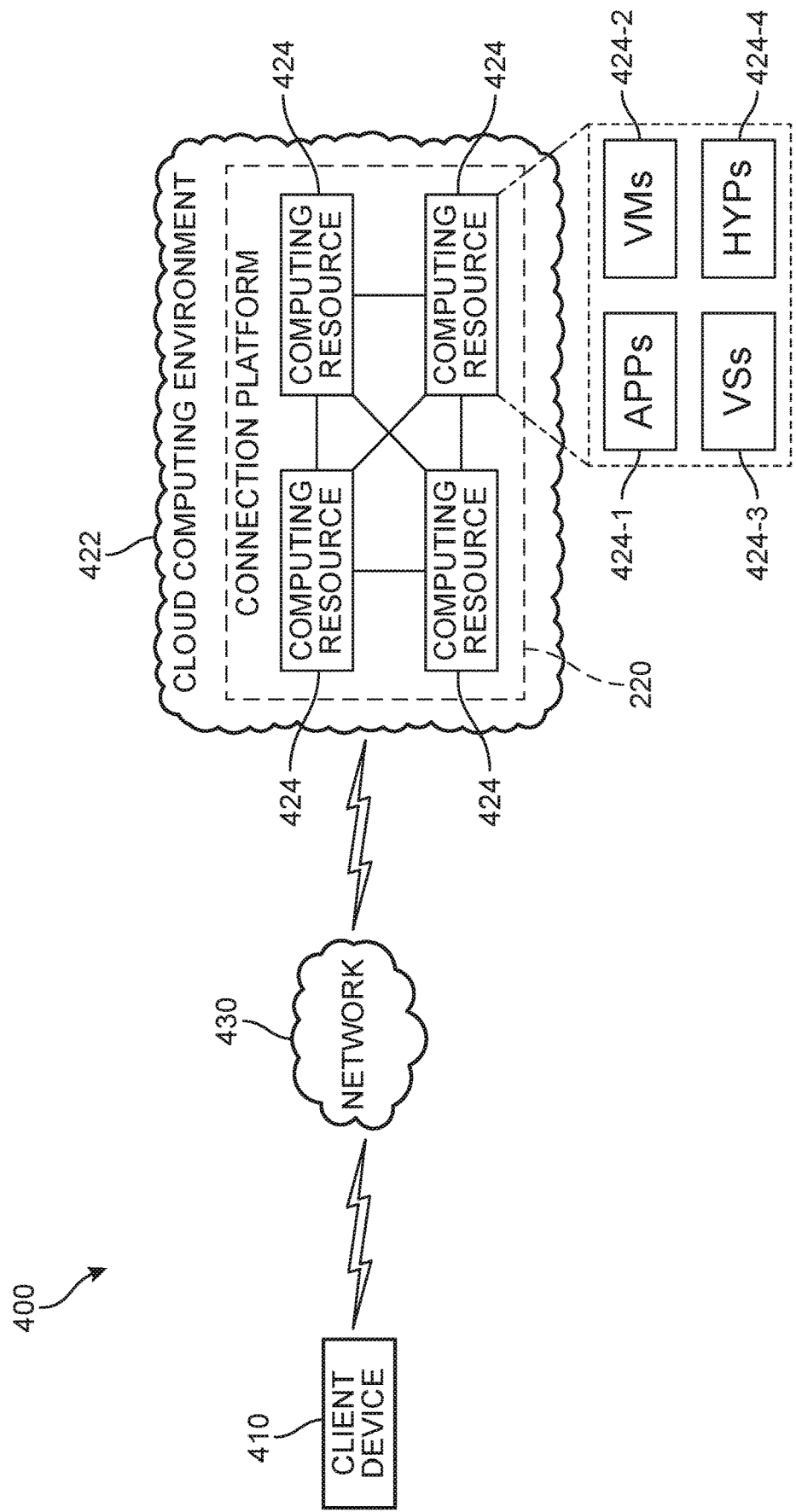
FIG. 4 is a schematic diagram of an example environment in which systems and/or methods, described herein, may be implemented.

FIG. 4 is a diagram of an example environment 400 in which systems and/or methods, described herein, may be implemented. As shown in FIG. 4, environment 400 may include a client device 410, a connection platform 420, and a network 430. Devices of environment 400 may interconnect via wired connections, wireless connections, or a combination of wired and wireless connections.

Client device 410 includes one or more devices capable of receiving, generating, storing, processing, and/or providing information, such as information described herein. For example, client device 410 may receive information from and/or transmit information to connection platform 420. In some implementations, client device 410 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a Global Positioning Satellite (GPS) device, a server device, a personal computer, or a similar type of device.

Connection platform 420 includes one or more devices that utilize machine learning models to analyze workflows and to modify workflows based on the analysis. In some implementations, connection platform 420 may be designed to be modular such that certain software components may be swapped in or out depending on a particular need. As such, connection platform 420 may be easily and/or quickly reconfigured for different uses. In some implementations, connection platform 420 may receive information from and/or transmit information to client device 410.

In some implementations, as shown, connection platform 420 may be hosted in a cloud computing environment 422. Notably, while implementations described herein describe connection platform 420 as being hosted in cloud computing environment 422, in some implementations, connection platform 420 may not be cloud-based (i.e., may be implemented outside of a cloud computing environment) or may be partially cloud-based.

Cloud computing environment 422 includes an environment that hosts connection platform 420. Cloud computing environment 422 may provide computation, software, data access, storage, etc. services that do not require end-user knowledge of a physical location and configuration of system(s) and/or device(s) that hosts connection platform 420. As shown, cloud computing environment 422 may include a group of computing resources 424 (referred to collectively as "computing resources 424" and individually as "computing resource 424").

Computing resource 424 includes one or more personal computers, workstation computers, server devices, or other types of computation and/or communication devices. In some implementations, computing resource 424 may host connection platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, and/or the like.

Application 424-1 includes one or more software applications that may be provided to or accessed by client device 410. Application 424-1 may eliminate a need to install and execute the software applications on client device 410. For example, application 424-1 may include software associated with connection platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program and may support a single process. In some implementations, virtual machine 424-2 may execute on behalf of a user (e.g., a user of client device 410 or an operator of connection platform 420), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
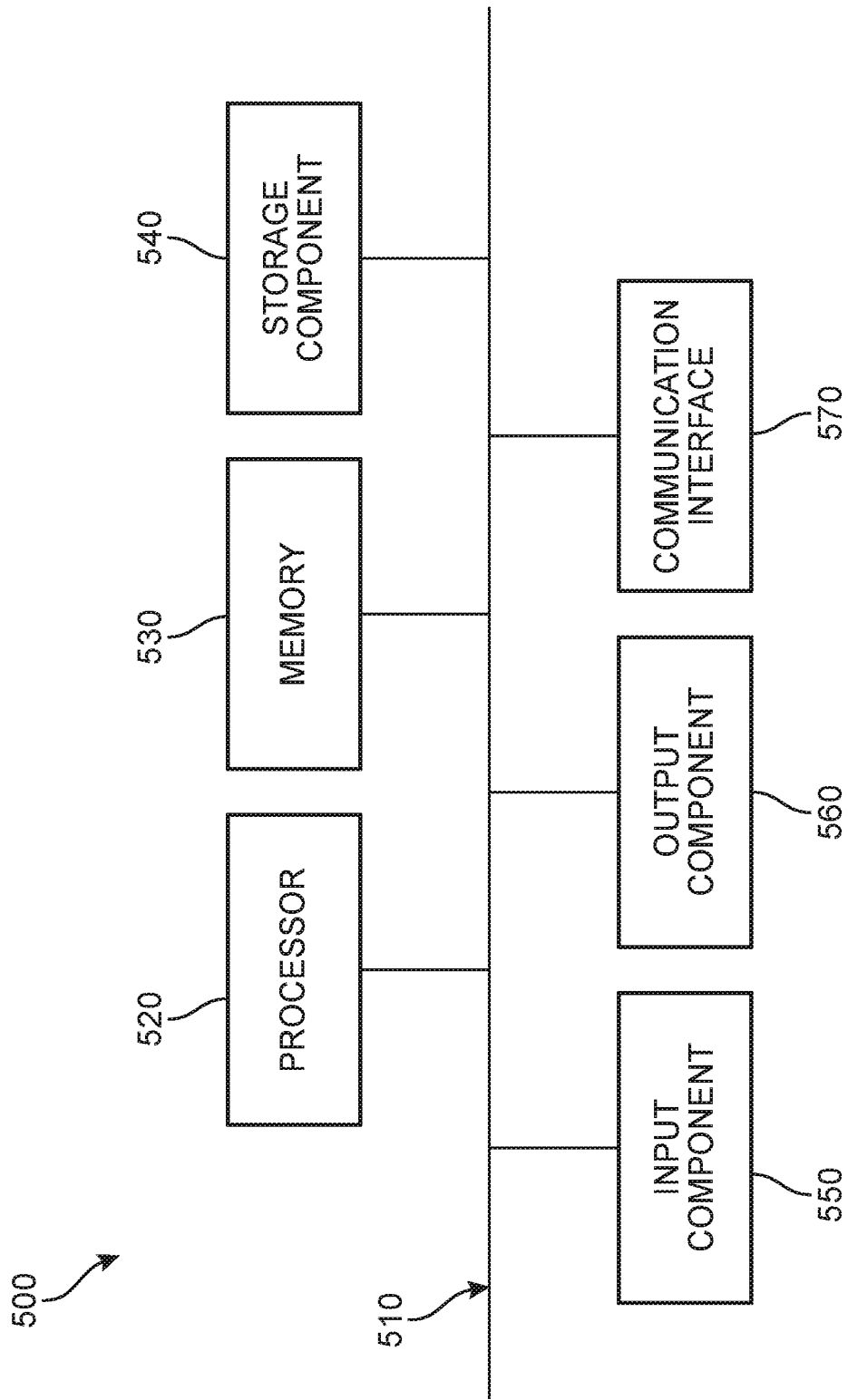
FIG. 5 is a schematic diagram of example components of a device.

FIG. 5 is a diagram of example components of a device 500. Device 500 may correspond to client device 410, connection platform 420, and/or computing resource 424. In some implementations, client device 410, connection platform 420, and/or computing resource 424 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
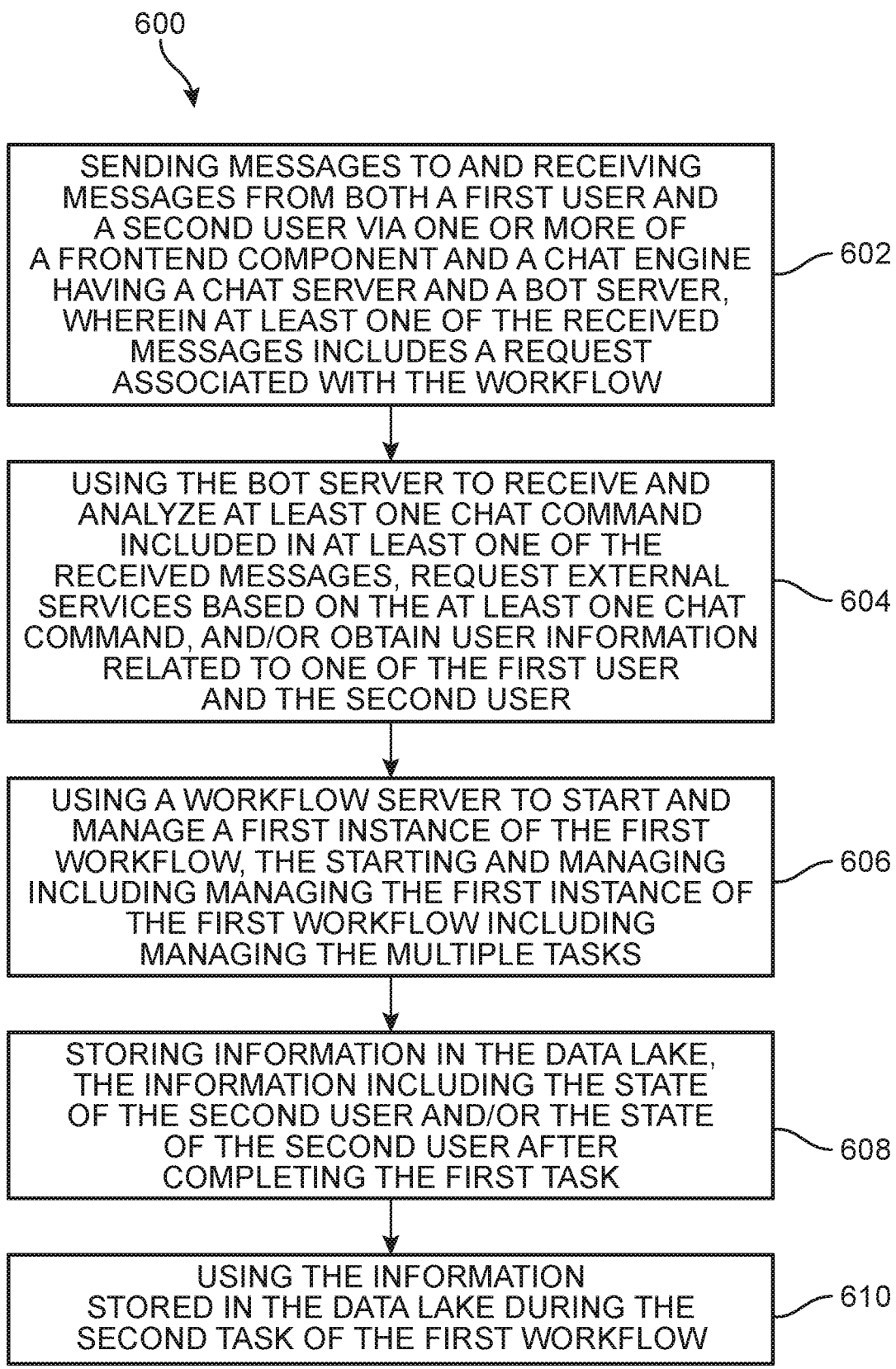
FIG. 6 shows a schematic diagram of a method of using a virtual agent to perform workflow, according to an embodiment.

FIG. 6 shows a schematic diagram of a method of using a virtual agent to perform a first workflow 600 (or method 600), according to an embodiment. Method 600 may include sending messages to and receiving messages from both a first user and a second user via one or more of a frontend component and a chat engine having a chat server and a bot server, wherein at least one of the received messages includes a request associated with the workflow (operation 602). The first user may have a first state and the second user may have a second state.

Method 600 may include using the bot server to (1) receive and analyze at least one chat command included in at least one of the received messages, (2) request external services based on the at least one chat command, and/or (3) obtain user information related to one of the first user and the second user (operation 604).

Method 600 may include using a workflow server to start and manage a first instance of the first workflow, the starting and managing including managing the first instance of the first workflow including multiple tasks (operation 606). The multiple tasks may include a first task and a second task.

Method 600 may include storing information in the data lake, the information including the state of the second user and/or the state of the second user after completing the first task (operation 608).

Method 600 may include using the information stored in the data lake during the second task of the first workflow (operation 610). For example, in an embodiment the method may modify the workflow based on the information stored in the data lake.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface (e.g., a text-based user interface), or the like. A user interface may provide information for display. In some implementations, a user may interact with the information, such as by providing input via an input component (e.g., a keyboard, mouse, microphone, etc.) of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of using a virtual agent to perform a first workflow comprising multiple tasks, the method comprising:
sending messages to and receiving messages from:
a first user,
the first user having a first state, and
a second user,
the second user having a second state,
the messages sent and received via one or more of a frontend component and a chat engine, and
the chat engine having a chat server and a bot server,
wherein at least one of the received messages includes a request associated with the first workflow;
using the bot server to:
receive at least one chat command included in at least one of the received messages,
obtain user information related to one of the first user and the second user;
using a workflow server that is different from the bot server to:
start and manage a first instance of the first workflow, the starting and managing the first instance of the first workflow including managing the multiple tasks,
wherein the multiple tasks include a first task and a second task;
storing information in a data lake, the information including the first state and the second state after completing the first task; and
using the information stored in the data lake during the second task of the first workflow.

2. The method of claim 1, wherein the first user is a first employee of a business entity and the second user is a second employee of the business entity and wherein the first user performs the first task and the second task.

3. The method of claim 2, further comprising sending messages related to the first workflow to and receiving messages from a third user, wherein the third user is a supervisor of the first user.

4. The method of claim 3, wherein the second task of the first workflow includes obtaining the third user's approval.

5. The method of claim 1, further comprising:
a second workflow including tasks that are different from both the first task and the second task, the second workflow having a second instance; and
using the workflow server to:
start and manage the second instance of the second workflow.

6. The method of claim 5, wherein the first workflow is related to a loan application and the second workflow is related to a credit review.

7. The method of claim 5, wherein the first state and the second state are both related to the first workflow.

8. The method of claim 1, further comprising using the bot server to:
request external services based on the at least one received chat command.

9. A non-transitory computer-readable medium storing software comprising instructions executable by one or more computers which, upon such execution, cause the one or more computers to:
send messages to and receive messages from:
a first user,
the first user having a first state, and
a second user,
the second user having a second state,
the messages sent and received via one or more of a frontend component and a chat engine, and
the chat engine having a chat server and a bot server,
wherein at least one of the received messages includes a request associated with a first workflow comprising multiple tasks;
use the bot server to:
receive at least one chat command included in at least one of the received messages,
obtain user information related to one of the first user and the second user;
use a workflow server that is different from the bot server to:
start and manage a first instance of the first workflow, the starting and managing the first instance of the first workflow including managing the multiple tasks,
wherein the multiple tasks include a first task and a second task;
store information in a data lake, the information including the first state and the second state after completing the first task; and
use the information stored in the data lake during the second task of the first workflow.

10. The non-transitory computer-readable medium storing software of claim 9, wherein the first user is a first employee of a business entity and the second user is a second employee of the business entity and wherein the first user performs the first task and the second task.

11. The non-transitory computer-readable medium storing software of claim 10, wherein the instructions further cause the one or more computers to send messages related to the first workflow to and receive messages from a third user, wherein the third user is a supervisor of the first user.

12. The non-transitory computer-readable medium storing software of claim 11, wherein the second task of the first workflow includes obtaining the third user's approval.

13. The non-transitory computer-readable medium storing software of claim 9, wherein the instructions further cause the one or more computers to use the workflow server to:
start and manage a second instance of a second workflow, the second workflow including tasks different from both the first task and the second task.

14. The non-transitory computer-readable medium storing software of claim 13, wherein the first workflow is related to a loan application and the second workflow is related to a credit review.

15. The non-transitory computer-readable medium storing software of claim 9, wherein the first state and the second state are both related to the first workflow.

16. The non-transitory computer-readable medium storing software of claim 9, wherein the instructions further cause the one or more computers to use the bot server to:
request external services based on the at least one chat command.

17. A system for using a virtual agent to perform a first workflow comprising multiple tasks, comprising:
one or more computers and one or more storage devices storing instructions that are operable, when executed by the one or more computers, to cause the one or more computers to:
send messages to and receive messages from:
a first user,
the first user having a first state, and a second user,
the second user having a second state,
the messages sent and received via one or more of a frontend component and a chat engine, and
the chat engine having a chat server and a bot server, wherein at least one of the received messages includes a request associated with the first workflow;
use the bot server to:
receive at least one chat command included in at least one of the received messages,
obtain user information related to one of the first user and the second user;
use a workflow server that is different from the bot server to:
start and manage a first instance of the first workflow, the starting and managing the first instance of the first workflow including managing the multiple tasks,
wherein the multiple tasks include a first task and a second task;
store information in a data lake, the information including the first state and the second state after completing the first task; and
use the information stored in the data lake during the second task of the first workflow.

18. The system of claim 17, wherein the first user is a first employee of a business entity and the second user is a second employee of the business entity and wherein the first user performs the first task and the second task.

19. The system of claim 17, wherein the instructions further cause the one or more computers to obtain user information related to one of the first user and the second user.

20. The system of claim 17, wherein the first user performs the first task and the second task.

* * * * *